(12) United States Patent
Matsuoka et al.

(10) Patent No.: US 6,188,453 B1
(45) Date of Patent: *Feb. 13, 2001

(54) DISPLAY APPARATUS HAVING TEST ELEMENTS UNDER OR BOUNDED BY THE SEALANT

(75) Inventors: Hideki Matsuoka, Gifu; Takao Suzuki, Hashima-gun; Norio Oku, Motosu-gun, all of (JP)

(73) Assignee: Sanyo Electric Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/162,983

(22) Filed: Sep. 29, 1998

(30) Foreign Application Priority Data

Sep. 30, 1997 (JP) .................................................. 9-266710

(51) Int. Cl.[7] .............................. G02F 1/1333; G02F 1/13

(52) U.S. Cl. ................................................ 349/54; 349/192
(58) Field of Search ..................... 349/54, 192; 324/770; 345/92

(56) References Cited

U.S. PATENT DOCUMENTS

| 5,576,730 | * | 11/1996 | Shimada et al. | 324/770 |
| 5,616,936 | * | 4/1997 | Misawa et al. | 345/180 |
| 5,754,158 | * | 5/1998 | Misawa et al. | 345/100 |

* cited by examiner

Primary Examiner—Walter J. Malinowski
(74) Attorney, Agent, or Firm—Hogan & Hartson, LLP.

(57) ABSTRACT

In a LCD with a built-in driver, the quality of all elements is judged. A test TFT is formed immediately below a sealing material which bonds a TFT substrate and an opposite substrate, wherein test terminals are pulled out onto the eaves section of the TFT substrate protruding from the opposite substrate. The quality of TFTs are judged by considering changes of TFT characteristics under the conditions before and after the bonding process.

15 Claims, 4 Drawing Sheets

DISPLAY APPARATUS HAVING TEST ELEMENTS UNDER OR BOUNDED BY THE SEALANT

BACKGROUND OF THE INVENTION

1. Filed of the Invention

The present invention relates to a display apparatus using optical materials, such as liquid crystal, and more particularly to a display apparatus having a driving circuit.

2. Description of the Related Art

Some display apparatuses, such as liquid crystal display apparatuses (LCD) in which a set of substrates having a predetermined wiring pattern thereon are bonded together across a small gap, and liquid crystal is sealed in the gap to form capacitors serving as display pixels using the liquid crystal as a dielectric layer, or an organic electroluminescent display apparatus using organic electroluminescence (EL) capable of controlling the amount of light emission depending on the current amount, are small, thin and low power consumption devices and have been developed for practical use as a desirable display in the field of office automation (OA) and audio-visual (AV) equipment. In particular, active matrix type displays which contain thin film transistors (TFTs) connected as switching devices for writing and maintaining a voltage of display signals in each display pixel capacitor have been widely applied their high definition display characteristics.

FIG. 3 is a plan view of a conventional liquid crystal display apparatus. The apparatus includes a TFT substrate 1 disposed at a distal end of the drawing, an opposite substrate 2 disposed at a proximal end of the drawing, a sealing material 3 made of a thermosetting bonding material, such as epoxy resin, for bonding the substrates 1 and 2 together. A small gap is secured between the TFT substrate 1 and the opposite substrate 2 by a spacer which is not shown. The sealing material 3 is partly removed to form an injection hole 31. A liquid crystal is injected into the hole 31 to fill the small gap and sealed therein by a sealing material 32.

TFTs are formed on the TFT substrate 1 using a channel layer made of polysilicon (p-Si). On the substrate 1, a display area 4 is provided which includes a plurality of gate lines (GL) and drain lines (DL) arranged perpendicularly to each other, and a matrix of pixel electrodes formed at individual intersections of the gate lines and the drain lines to serve as one side of display pixel capacitors (LC), auxiliary capacitors (SC) used for charge accumulation, and pixel TFTs (SE) connected to individual pixel electrodes and the auxiliary capacitors (SC). A gate driver 5 is disposed at the periphery of the display area 4 for supplying a scan signal to the pixel TFTs (SE), and a drain driver 6 is also disposed at the periphery of the display area 4 and synchronized with the scanning operation of the gate driver 5 to supply a display signal voltage to the pixel TFTs (SE). These drivers 5, 6 are formed by CMOS using p-Si TFT having the same structure as the display area 4. The p-Si TFT can be used not only for the pixel TFTs (SE), but also for peripheral devices, such as peripheral drivers for actuating the pixel TFTs (SE), because the p-Si TFT operates at a sufficiently high speed. This allows a LCD with a built-in driver to be achieved, in which drivers are contained in a display panel. In the drawing, a reference number 8 indicates a signal input terminal of a driver, and 9 indicates a test terminal of a test TFT which will be described later.

A common electrode is formed on the entire surface of the opposite substrate 2 to serve as the second side of the display pixel capacitors (LC). Thus, the display pixel capacitors are formed by the liquid crystal and the common electrode partitioned for each pixel electrode.

FIG. 4 is an enlarged plan view of the area where the input terminals 8 and the test terminals 9 are arranged on the eaves section of the TFT substrate 1 protruding from the opposite substrate 2. A test TFT 10 is formed by a TFT of the same structure as the display area 4 and the driver sections 5, 6, and is tested by putting a measurement needle against the test terminals 9 to judge the quality of the TFT 10, to thereby determine the quality of other TFTs.

In the TFT LCT using p-Si, the advantage of high speed operation is utilized to decrease the size of pixel TFTs (SE) and increase the number of pixels for realizing high definition display. Also, as mentioned above, similar TFTs are arranged on the periphery of the display area 4 to form the drivers 5, 6 within the LCD panel to achieve a built-in driver. As a result, the number of TFT elements formed on the same TFT substrate 1 is significantly increased. Unless all the TFT elements operate properly, the display apparatus reflecting the above advantage cannot operate in a good condition.

Conventionally, as shown in FIG. 4, the test TFT 10 is formed on the eaves section of the TFT substrate 1 where the input terminal 8 are arranged, and the operation of the TFT 10 is monitored to judge the quality of the TFT in the display area 4 and the drivers 5, 6.

As can be seen in FIG. 4, such a test TFT 10 is only formed on a portion of the TFT substrate 1 exposed to the ambient. However, such a TFT is in a different condition from other TFT elements contacting the liquid crystal layer in part of the display area 4 and the drivers 5, 6 within the area enclosed by the sealing material 3, or some TFT elements in part of the drivers 5, 6 immediately below the sealing material 3. Specifically, since the externally exposed TFT is vulnerable to moisture, foreign objects, etc., such a TFT deteriorates easily compared to other TFTs located in the display area 4 or the drivers 5, 6. Also, the sealing material 3, which bonds together and supports both substrates 1,2, receives a substantial amount of stress, even if some measures, such as to cover all surfaces of TFTs by a protective film like a planarized isolation film, are taken. Accordingly, those TFTs located immediately below the sealing material 3 also receive a certain amount of stress which cannot be ignored. In this respect, these TFTs are considered to be more likely to deteriorate than he externally exposed TFTs.

Therefore, it has been difficult to judge the quality of all elements constituting the LCD with a built-in driver merely by testing the test TFT 10 located in the exposed area of the TFT substrate 1.

SUMMARY OF THE INVENTION

The present invention provides a display apparatus with a built-in driver circuit capable of judging characteristics of a given element located immediately below a region where a bonding material is applied or located facing liquid crystal after both substrates are bonded together and also after liquid crystal is injected. By monitoring the characteristics of the element subjected to specific conditions of the region immediately below the bonding material or facing the liquid crystal, the reliability of the apparatus is improved.

BRIEF DESCRIPTION OF THE DRAWING(S)

DESCRIPTION OF PREFERRED EMBODIMENT

Figure 1:
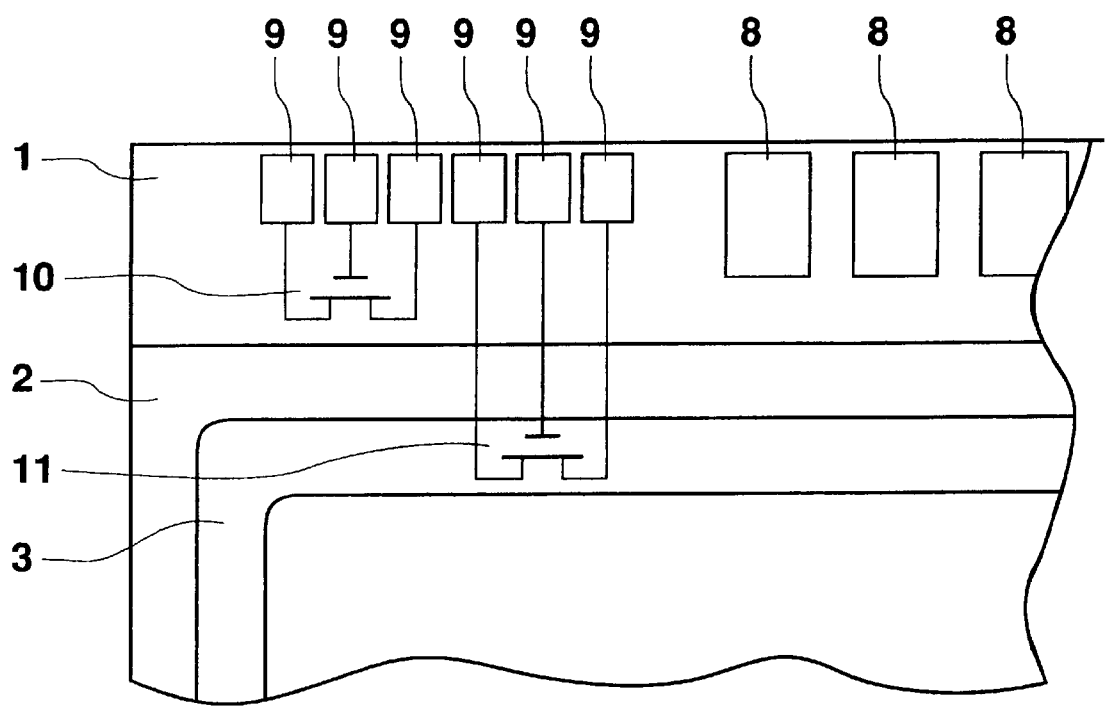
FIG. 1 is an enlarged plan view showing a major part of a display apparatus according to a first embodiment of the present invention.
Figure 3:
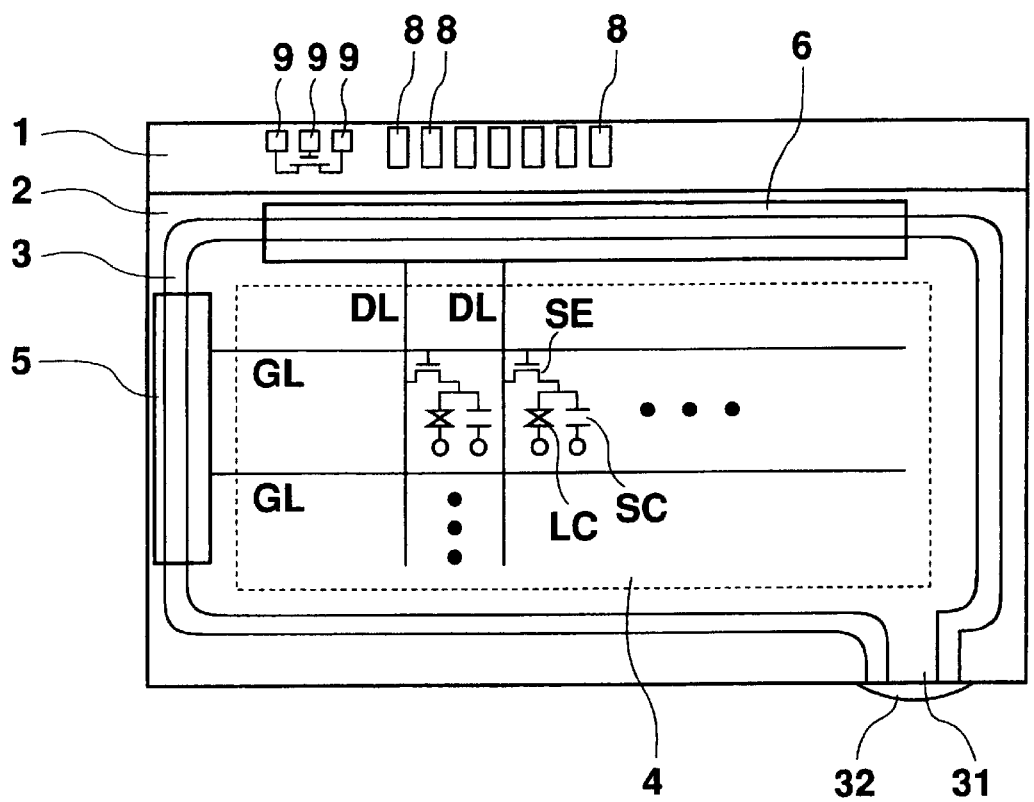
FIG. 3 is a plan view of a display apparatus.
Figure 4:
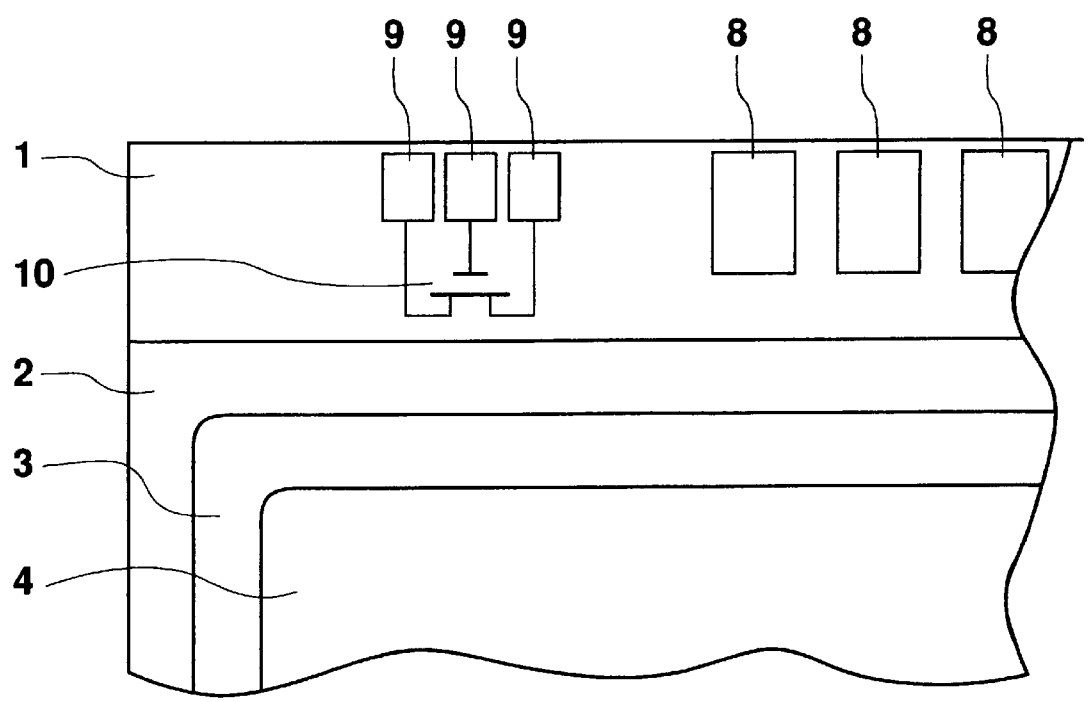
FIG. 4 is an enlarged plan view of a conventional display apparatus.

FIG. 1 is an enlarged plan view showing a major portion of display apparatus according to a first embodiment of the present invention. It is noted that the entire plan view of the display apparatus is similar to that shown in FIG. 3. A TFT substrate 1 having p-Si TFTs formed thereon includes a display area 4 having a matrix of pixel electrodes constituting one side of display pixel capacitors (LC), pixel TFTs (SE) connected to the pixel electrodes, and auxiliary capacitors (SC) used for charge accumulation, these elements being arranged at individual intersections of a plurality of gate lines (GL) and drain lines (DL) crossing each other perpendicularly. A gate driver 5 and a drain driver 6 are arranged at the periphery of the display area 4 for actuating the pixel TFTs (SE). The drivers 5, 6 are formed by CMOS having the same TFT structure as the pixel TFTs (SE). Signal input terminals 8 of the drivers 5, 6 are provided at the end of the substrate 1. An opposite substrate 2 has a common electrode formed on the entire surface of the substrate, the common electrode constituting the other side of the display pixel capacitors (LC). The TFT substrate 1 and the opposite substrate 2 are bonded together by circumferentially applying a sealing material 3 across a small gap, into which liquid crystal is injected through an injection hole 32 and sealed with the sealing material 3.

The input terminals 8 of the drivers 5, 6 and test terminals 9 of test TFTs 10, 11, which are described below, are arranged on the eaves section of the TFT substrate 1 exposed to the ambient and protruding from the opposite substrate 2.

According to the present invention, the test TFT 11 is formed immediately below a region where the sealing material 3 is applied, and the test terminals 9 connected to a gate, source, and drain, respectively, are pulled out of that region. Thus, it is possible to judge the quality of other TFTs disposed immediately below the sealing material 3 by monitoring the operating characteristics of the test TFT 11 by putting a measurement needle against the exposed test terminals 9, even after both substrates 1, 2 are bonded together with the sealing material 3.

Usually, the sealing material 3 is provided on the protective film, such as a planarized isolating film covering the entire surface of the TFT elements. However, since the sealing material 3, which bonds the substrates 1 and 2 to support them, is likely to receive a substantial amount of stress especially after bonding and prior to the housing process in which the apparatus is accommodated into a housing and protected therein, the sealing material 3 may receive a reasonably high amount of stress and, accordingly, the TFTs located below the underlying planarized isolating film may also receive a certain amount of stress which cannot be ignored. According to the present invention, defective products are found before shipment of the products by monitoring the quality of the TFTs located below the sealing material 3 even after the bonding process with the sealing material 3 is completed. In addition, the test results of the test TFT 11 may be reflected in the manufacturing process to increase reliability.

Figure 2:
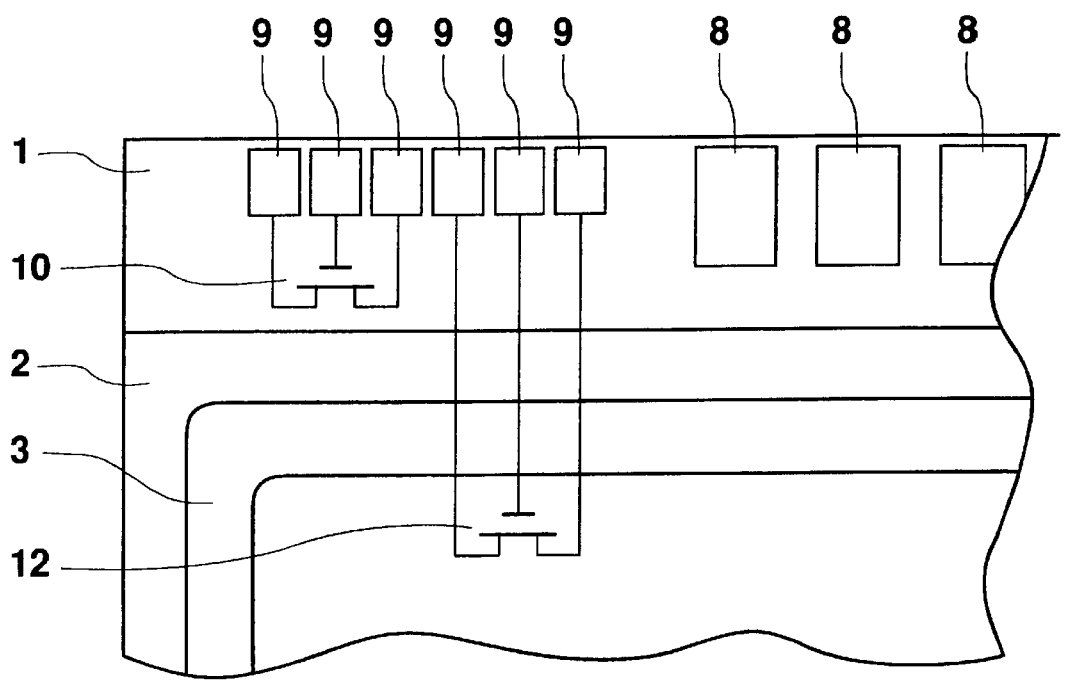
FIG. 2 is an enlarged plan view showing a major part of a display apparatus according to a second embodiment of the present invention.

FIG. 2 is an enlarged plan view showing a major part of the display apparatus according to a second embodiment of the present invention. In this embodiment, a test TFT 12 is disposed within the region surrended by the sealing material 3, that is, the region facing the liquid crystal layer. Test terminals 9 connected to a gate, source, and drain, respectively, are taken out of the region where the sealing material 3 is applied. Thus, it is possible to judge the quality of other TFTs disposed within the region where the sealing material 3 is applied by monitoring the operating characteristics of the test TFT 12 by putting a measurement needle against the exposed test terminals 9 even after the liquid crystal injecting process as well as the bonding process of both substrates 1, 2 with the sealing material 3.

The ability to monitor the characteristics of the TFTs located immediately below or within the region of the sealing material 3 speeds up detection of defects of the display apparatus attributing to TFTs by monitoring changes of TFT characteristics after the electrode board fabricating process.

What is claimed is:

1. A display apparatus comprising:
   a pair of substrates bonded with an adhesive applied circumferentially, so as to sandwich an optical material between said pair of substrates;
   a plurality of control elements disposed on one of said pair of substrates on a side facing the other substrate and controlled in response to a display signal for controlling said optical material to display each pixel independently;
   a plurality of signal input terminals formed on one of the substrates and connected to the control elements for applying the display signal;
   a testing element having a similar structure to said control elements and disposed in an area directly below said adhesive on one of said pair of substrates on a side facing the other substrate, the testing element being electrically isolated from the signal input terminals; and
   a test terminal connected to said testing element and adapted to receive a test signal to test characteristics of said testing element.

2. The display apparatus according to claim 1, wherein said optical material is liquid crystal.

3. The display apparatus according to claim 2, wherein said control elements are thin film transistors made of polysilicon.

4. The display apparatus according to claim 3, wherein said control elements are pixel transistors for controlling voltage applied to a display electrode provided for each pixel.

5. The display apparatus according to claim 3, wherein said control elements are transistors of a driving circuit for generating a control signal for pixel transistors in response to a display signal, said pixel transistors controlling voltage applied to a display electrode provided for each pixel.

6. A display apparatus comprising:
   a pair of substrates bonded with an adhesive applied circumferentially, so as to sandwich an optical material between said pair of substrates;
   a plurality of control elements disposed on one of said pair of substrates on a side facing the other substrate and controlled in response to a display signal for controlling said optical material to display each pixel independently;
   a plurality of signal input terminals formed on one of the substrates and connected to the control elements for applying the display signal;
   a testing element having a similar structure to said control elements and disposed on one of said pair of substrates in an area surrounded by said adhesive on one of said pair of substrates on a side facing the other substrate, the testing element being electrically isolated from the signal input terminals; and a test terminal connected to said testing element and adapted to receive a test signal to test characteristics of said testing element.

7. The display apparatus according to claim 6, wherein said optical material is liquid crystal.

8. The display apparatus according to claim 7, wherein said control elements are thin film transistors made of polysilicon.

9. The display apparatus according to claim 8, wherein said control elements are pixel transistors for controlling voltage applied to a display electrode provided for each pixel.

10. The display apparatus according to claim 8, wherein said control elements are transistors of a driving circuit for generating a control signal for pixel transistors in response to a display signal, said pixel transistors controlling voltage applied to a display electrode provided for each pixel.

11. A method for providing a display apparatus with a testing element comprising:

bonding a pair of substrates with an adhesive applied circumferentially thereon so as to sandwich an optical material between the pair of substrates;

forming a plurality of control elements on one of the substrates on a side facing the other substrate, the control elements being responsive to a display signal for controlling the optical material to display each pixel independently;

providing a plurality of signal input terminals on one of the substrates, the signal input terminals being connected to the control elements for applying the display signal;

providing a testing element having a similar structure to the control elements and disposed on one of the substrates on a side facing the other substrate either in an area directly below the adhesive or in an area surrounded by the adhesive, the testing element being electrically isolated from the signal input terminals; and providing a test terminal connected to the testing element and adapted to receive a test signal to test characteristics of said testing element.

12. The method of claim 11, wherein the optical material is liquid crystal.

13. The method of claim 12, wherein the control elements are thin film transistors made of polysilicon.

14. The method of claim 13, wherein the control elements are pixel transistors for controlling a voltage applied to a display electrode provided for each pixel.

15. The method of claim 13, wherein the control elements are transistors of a driving circuit for generating a control signal for pixel transistors in response to a display signal, the pixel transistors controlling a voltage applied to a display electrode provided for each pixel.

* * * * *